United States Patent
Farmos

[11] Patent Number: 6,123,635
[45] Date of Patent: Sep. 26, 2000

[54] PROPULSION APPARATUS FOR A CYCLE

[76] Inventor: George T. Farmos, 5733 Crestmont Ave., Livermore, Calif. 94550

[21] Appl. No.: 09/198,425

[22] Filed: Nov. 24, 1998

Related U.S. Application Data

[63] Continuation-in-part of application No. 09/149,768, Sep. 8, 1998.

[51] Int. Cl.[7] ............................. F16H 55/30; B62M 1/04; B62M 1/00
[52] U.S. Cl. ........................... 474/152; 474/160; 280/252; 280/255
[58] Field of Search ..................................... 474/156, 152, 474/144, 159, 140, 147, 206; 200/252, 255, 258, 251, 256, 257; 74/561

[56] References Cited

U.S. PATENT DOCUMENTS

| | | | |
|---|---|---|---|
| 3,132,877 | 5/1964 | Pontin | 280/257 |
| 3,891,235 | 6/1975 | Shelly | 280/252 |
| 4,169,609 | 10/1979 | Zampedro | 280/252 X |
| 5,104,137 | 4/1992 | Kilts | 280/255 |
| 5,236,211 | 8/1993 | Meguerditchian | 280/252 X |
| 5,496,051 | 3/1996 | Farmos . | |
| 5,690,345 | 11/1997 | Kiser | 474/160 X |

*Primary Examiner*—Lenard A. Footland
*Assistant Examiner*—Marcus Charles
*Attorney, Agent, or Firm*—Thomas R. Lampe

[57] ABSTRACT

Manually powered propulsion apparatus for propelling a cycle includes two pedals which move along parallel linear tracks. A flexible member forming an endless loop is connected to the two pedals to raise a pedal when the other is depressed by a cyclist. In addition, each pedal is connected to an endless flexible member extending around one of a pair of rotatable crank member. Rotation of the crank members results in a propelling force being applied to a wheel of the cycle.

14 Claims, 5 Drawing Sheets

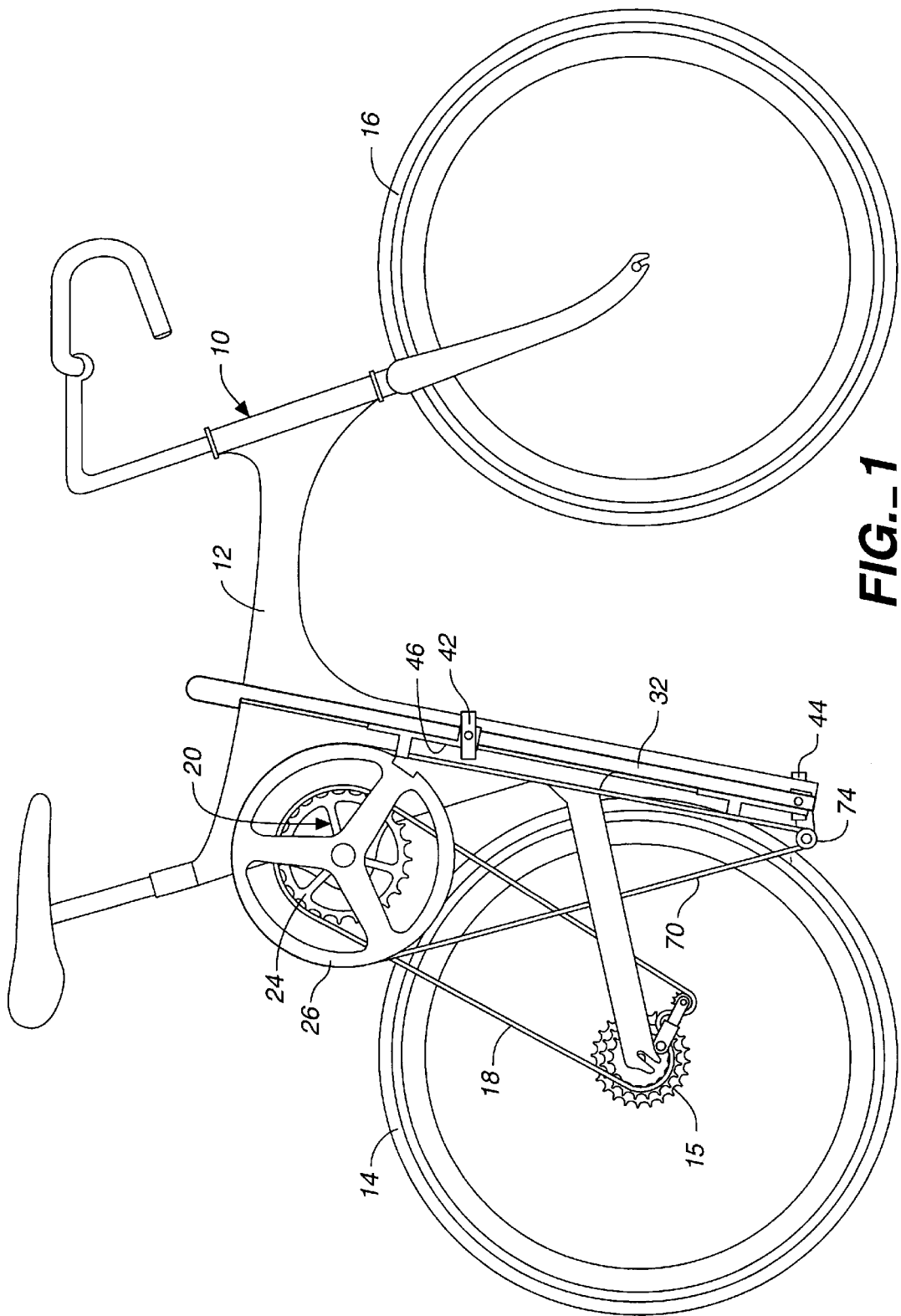
FIG._1

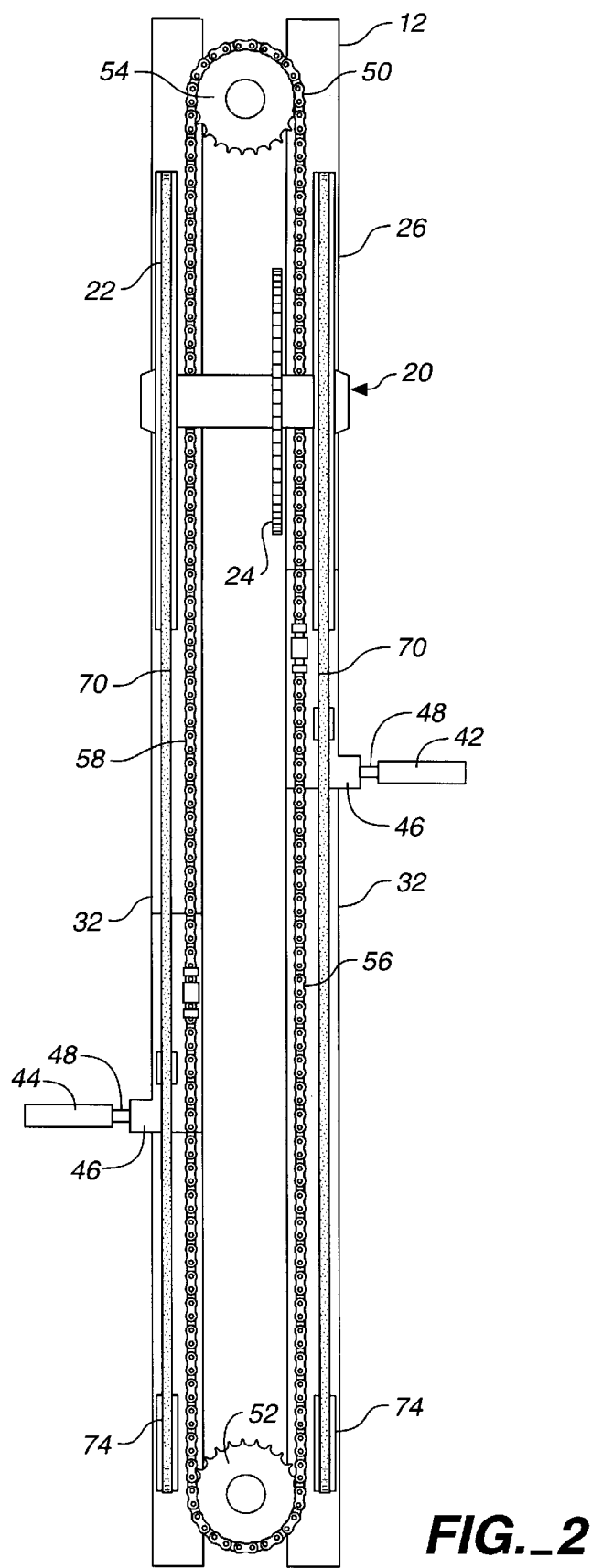
FIG._2

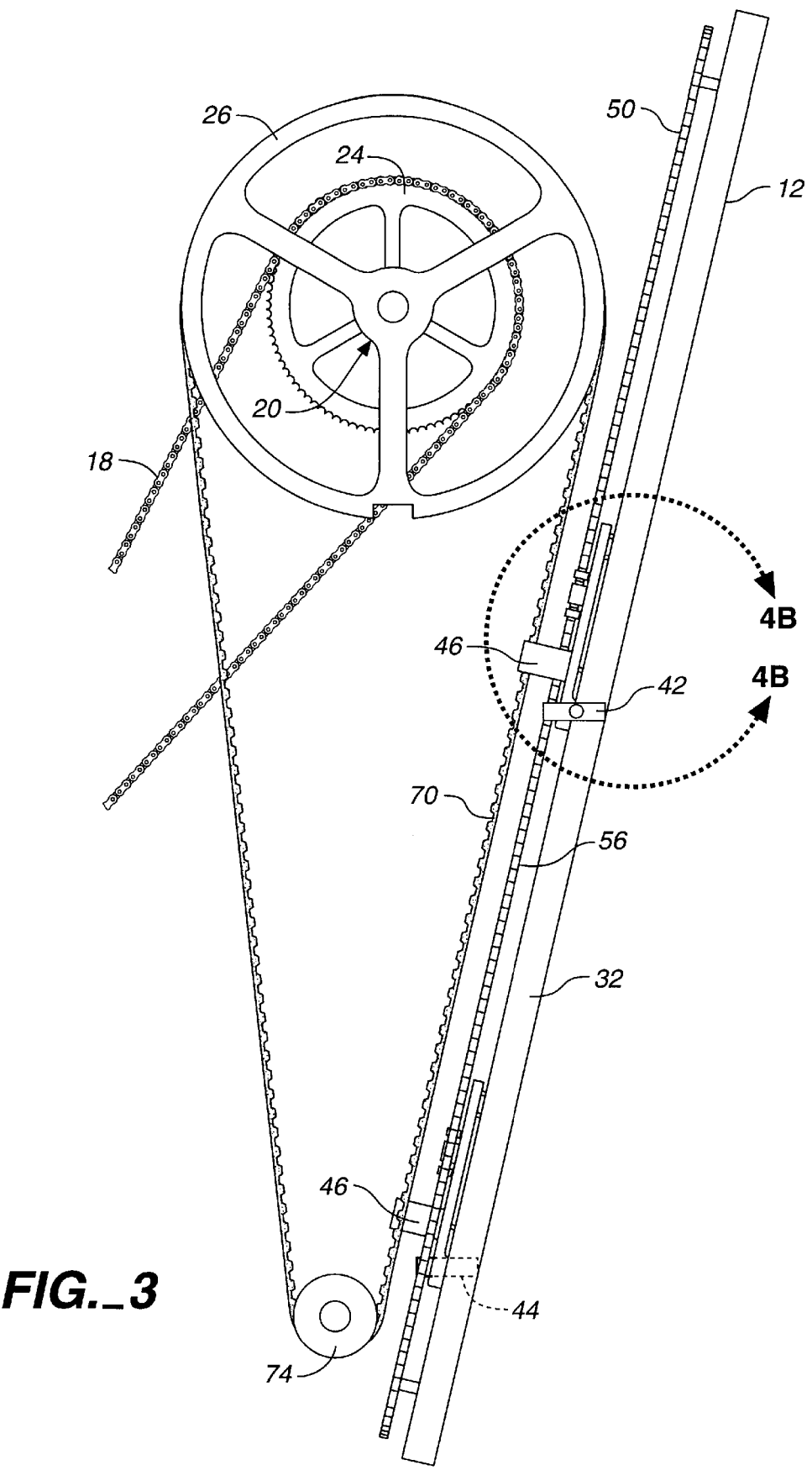
FIG._3

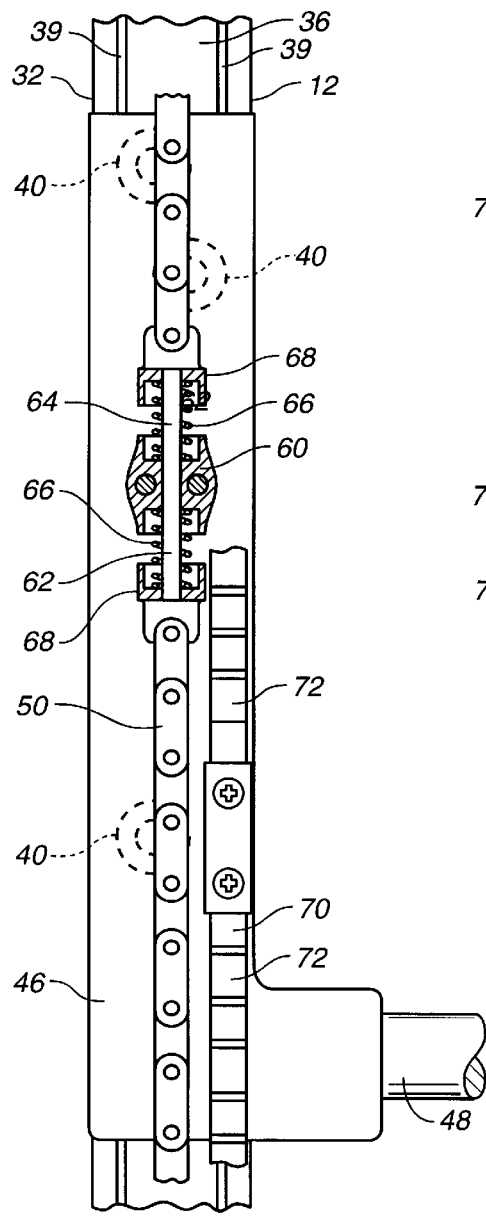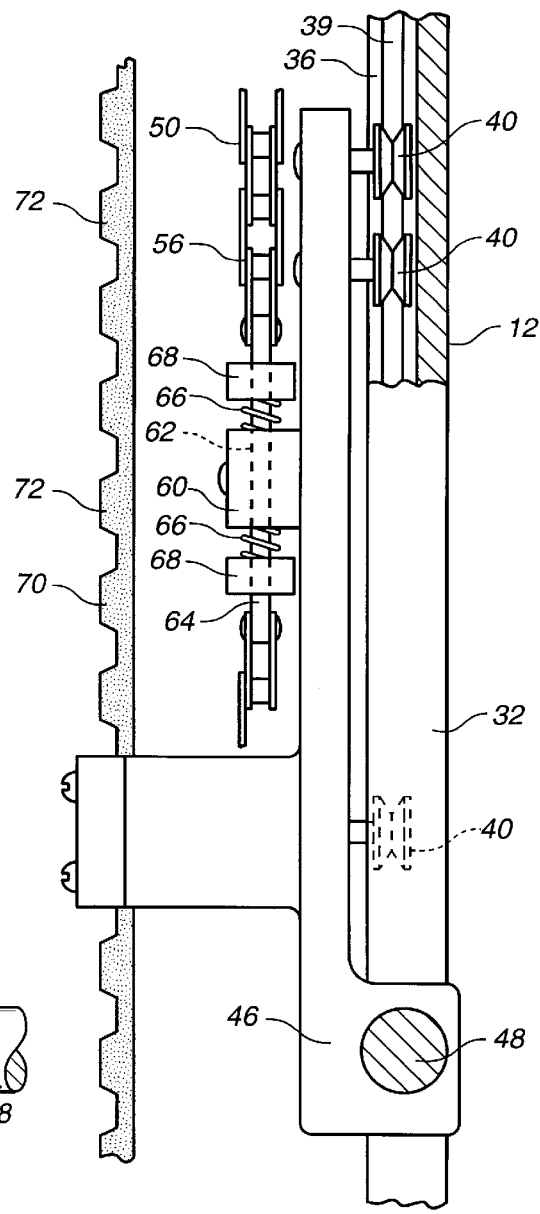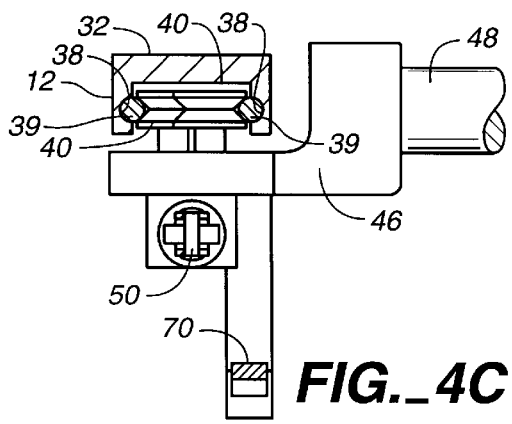
FIG._4A   FIG._4B   FIG._4C

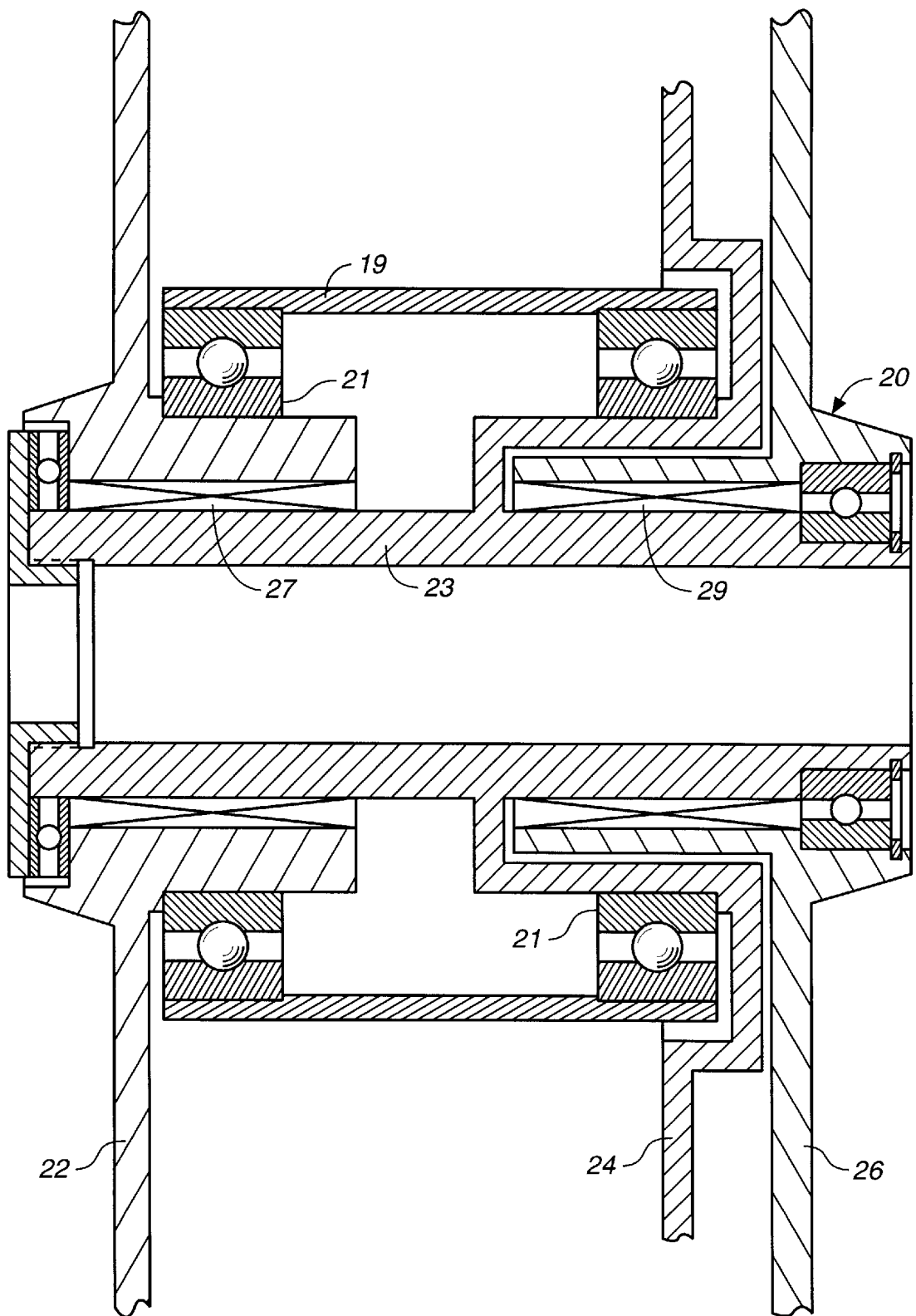
FIG._5

PROPULSION APPARATUS FOR A CYCLE

This application is a continuation-in-part of my U.S. patent application Ser. No. 09/149,768, filed Sep. 8,1998.

TECHNICAL FIELD

This invention relates to manually powered propulsion apparatus. The invention has particular applicability to manually-powered cycles such as bicycles. With respect to the latter, the apparatus propels a bicycle through force exerted by a rider on pedals incorporated in the apparatus.

BACKGROUND OF THE INVENTION

Many propulsion and transmission systems are known in the prior art for use with bicycles and other manually-powered cycles such as exercycles. Most commonly, the cycle is propelled or operated by foot pedals which are connected through suitable transmission means to one or more of the cycle wheels, the pedals rotating about a central axis passing through the cycle frame along a circular path of movement about the axis when pumped by the rider.

My U.S. Pat. No. 5,496,051, issued Mar. 5, 1996, discloses apparatus for propelling a manually-powered cycle including first and second pedals which move along spaced, linear paths of movement. The pedals are connected to the drive wheel of the cycle through a power train including elongated flexible transmission elements which wrap about rotatable crank members used to drive the cycle.

My U.S. patent application Ser. No. 09/149,768, filed Sep. 8, 1998, discloses a manually-powered propulsion apparatus including a flexible transmission member having pivotally interconnected link members which cooperate to form a curved, self supporting structure between a rotatable member of the apparatus and a pedal when the pedal moves from extended to retracted position.

DISCLOSURE OF INVENTION

The present invention also relates to manually-powered propulsion apparatus which may be employed to power a cycle wherein the pedals are operatively connected to the drive wheel of the cycle through elongated flexible transmission means.

However, a number of differences exist between the apparatus of the present invention and those of U.S. Pat. No. 5,496,051 and the pending application referenced above. The apparatus of the present invention is characterized by its simplicity of construction, reliability and ease of operation.

The manually-powered propulsion apparatus of the present invention includes first and second pedals and pedal guide means. The pedals are on mounting means comprising first and second mounts slidable along the pedal guide means for reciprocating movement of the pedals between retracted and extended pedal positions.

The apparatus also includes a first rotatable crank member and a second rotatable crank member mounted on a cycle frame along with a rotatable driver member.

Transmission means is operatively associated with the first and second pedals and the first and second rotatable crank members to transfer power alternatively from the first and second pedals through the first and second crank members to the rotatable driver member for imparting torque to the rotatable driver member responsive to alternate depression of the pedals along the pedal guide means from the retracted positions thereof to the extended positions thereof. The crank members have curved outer surfaces and the transmission means includes a first flexible member forming a first loop extending about the first crank member in engagement with the curved outer surface thereof and a second flexible member forming a second loop extending about the second crank member in engagement with the curved outer surface thereof. The first mount is attached to the first flexible member and the second mount is attached to the second flexible member, movement of the mounts along the pedal guide means causing rotation of the first and second flexible members and the first and second crank members.

Pedal interconnecting means interconnects the first and second pedals and is operable to move one of the pedals to a retracted position from an extended position when the other of the pedals is depressed by a force applied thereto and moves to the extended position thereof from the retracted position thereof.

The pedal interconnecting means comprises a third flexible member, the first and second mounts being affixed to the third flexible member at spaced locations on the third flexible member.

The third flexible member forms a third loop, the first and second loops being disposed in parallel planes and the third loop disposed in a plane perpendicular to the parallel planes.

Other features, advantages, and objects of the present invention will become apparent with reference to the following description and accompanying drawings.

BRIEF DESCRIPTION OF DRAWINGS

FIG. 1 is a side view of a bicycle illustrating selected structural elements of apparatus constructed in accordance with the teachings of the present invention;

FIG. 2 is a diagrammatic rear view illustrating selected operative components of the present apparatus including pedals, pedal mounts and three flexible members utilized in the apparatus;

FIG. 3 is a diagrammatic side view illustrating selected operative components of the present apparatus including a rotatable crank member, a flexible member forming a loop extending about the crank member and movable pedal mounts attached to the flexible member;

FIG. 4A is an enlarged elevational view in partial cross-section illustrating details of selected components of the apparatus;

FIG. 4B is an enlarged side view of structure of the apparatus delineated by line 4B—4B in FIG. 4, portions of the structure broken away or in cross section;

FIG. 4C is an enlarged detail plan view in partial cross-section illustrating details of a pedal mount, a trackway and related structure; and FIG. 5 is a greatly enlarged cross-sectional view illustrating in somewhat diagrammatic format structure including a clutch and bearing assembly employed in the apparatus.

BEST MODE FOR CARRYING OUT THE INVENTION

Referring now to the drawings, a bicycle 10 incorporating apparatus of the present invention includes a frame 12 and wheels 14, 16. Wheel 14 is driven by a chain 18 connected to a conventional multi-sprocket gear assembly 15.

Connected to frame 12 by any suitable means is an assembly 20. Assembly 20 includes a housing 19 and bearings 21 (see FIG. 5). Rotatably journaled within housing 19 and bearings 21 is a sprocket shaft 23. A rotatable drive sprocket or driver member 24 is affixed to sprocket shaft 23 and extends adjacent to and outwardly of the housing 19. Drive sprocket or driver member 24 is of circular configuration and has teeth about the outer periphery thereof which engage chain 18. Member 24 is rotatable to drive the wheel 14 through the intermediate chain 18.

Refering to FIG. 5 located near the opposed ends of the assembly 20 are a first rotatable crank member 22 and a second rotatable crank member 26, the crank members being coaxial with the sprocket shaft 23. In the interest of clarity crank member 22 is not shown in FIG. 1. As viewed in FIG. 1, however, clockwise rotation of either first rotatable crank member 22 or second rotatable crank member 26 will result in rotation of the driver member 24, the chain 18 and the wheel 14.

Referring once again to FIG. 5, crank members 22 and 26 are journaled on clutch and bearing assemblies 27, 29, respectively. The clutch and bearing assemblies can be of conventional construction and are illustrated diagrammatically. Rotation of the respective crank members 22, 26 clockwise (as viewed in FIG. 1) will cause rotation of sprocket shaft 23 and driver member 24 through the one-way clutches 27, 29 of assemblies. However, the one-way clutches 27, 29 will allow ready counter-clockwise rotation of the crank members 22 and 26 without affecting movement of the sprocket shaft and driver member 24.

Frame 12 of the bicycle includes two parallel frame members 32 which are in the form of channels defining interiors or trackways 36. In the interest of simplicity and clarity, only one such frame member 32 is illustrated in detail; however, it is to be understood that the other frame member 32 is of identical construction, the only difference being that it is located on the other side of the frame. My U.S. Pat. No. 5,496,051 may be referred to for a teaching of the concept of employing two trackways disposed side-by-side to guide movement of two pedals of a cycle propulsion mechanism and the teachings of such patent are incorporated herein by reference.

In the embodiment illustrated, each frame member (see FIG. 4C) has parallel recesses 38 formed therein and extending the length thereof. Recesses 38 accommodate elongated rod-like members 39 formed of hard material such as steel or other suitable low friction material which will function as guides in the trackway for rollers 40 operatively associated with pedals employed in the apparatus in a manner which will now be described.

Rollers 40 comprise portions of the mounting means employed to mount pedals 42, 44 to the rest of the apparatus.

Pedals 42, 44 are connected to and project from two pedal mount members 46, the pedals being rotatable on pedal mounting shafts 48 of the mount members. The rollers 40 allow the pedal mount members and pedals to freely move up and down along the trackways 36 of frame members 32.

Connected to each pedal through its associated pedal mount member is an elongated flexible member 50 which in the disclosed embodiment is in the form of a chain formed of pivotally interconnected chain links. In the interest of clarity and simplicity, chain 50 and other structure operatively associated therewith which will now be described have not been illustrated in FIG. 1. However, reference may be had to FIGS. 2 through 4C in connection with the following description.

Chain 50 forms an endless loop and passes under a toothed roller or sprocket 52 which is rotatably mounted on the frame 12 of the bicycle. The chain 50 passes over a toothed roller 54 which is rotatably mounted on the frame 12 at a location spaced from roller 52. A housing (not shown) may be incorporated with the frame and utilized to cover the chain 50, rollers 52, 54 and possibly other related structural components. Elongated flexible member or chain 50 includes two parallel straight segments 56 and 58, such segments extending upwardly from the roller 52.

One pedal mount 46 is connected to segment 56 and the other connected to segment 58. As may perhaps best be seen with reference to FIGS. 4A and 4B, each pedal mount member 46 has a projecting portion 60 in the nature of a bushing defining a throughbore 62. Slidably disposed within each throughbore 62 is an elongated connector link 64 of chain 50. Coil compression springs 66 are disposed about connector link 64 and are maintained under compression between the projecting member or portion 60 and flanges or caps 58 affixed at or near the ends of connector link 64.

It will be appreciated that downward movement of one of the pedals will cause the other to move upwardly, the elongated flexible member 50 rotating about its associated sprockets with every down stroke of a pedal. The combination of projecting portion or member 60, elongated connector link 64, coil compression springs 66 and end caps 68 operates as a shock absorber for chain 50 during alternating depression of the pedals. This smooths out the transition between pedals when the cyclist switches leg power from one to the other.

Also attached to each of the pedal mounts 46 is a flexible member 70. Two such flexible members are employed in the apparatus. The elongated flexible members 70 are of identical construction. In the arrangement illustrated, the flexible members 70 are in the form of endless belts having projections 72. Each flexible member 70 loops about one of the rotatable crank members, being disposed in a channel extending about the periphery thereof.

Each flexible member 70 passes under an idler sprocket or roller 74 rotatably mounted on bicycle frame 12 in any suitable manner, there being two such idler sprockets rotatably mounted on frame 12. For a portion of its length each flexible member 70 is parallel to the paths of movement of the pedal mount members 46 on trackways 36 between its associated idler sprocket and rotatable crank member.

The closed loops formed by the flexible members 70 are disposed in parallel planes and the closed loop formed by flexible member or chain 50 is disposed in a plane perpendicular to the parallel planes.

It will thus be seen that depression of either one of the two pedals of the apparatus will cause rotation of its associated flexible member 70 and rotatable crank member. This will in turn cause rotation of driver member 24, chain 18 and wheel 14 to propel the bicycle. At the same time, rotation of flexible member 50 will take place and raise the other pedal from its extended or depressed condition to its raised or retracted position. The pedals are alternatively depressed by the cyclist as long as propulsion is desired.

What is claimed is:

1. Manually powered propulsion apparatus for propelling a cycle having a cycle frame, said propulsion apparatus comprising, in combination:

a first pedal;

a second pedal;

pedal guide means comprising spaced first and second tracks mounted on said frame;

mounting means mounting said first and second pedals on said pedal guide means for reciprocating movement of said first and second pedals between retracted and extended pedal positions, said mounting means comprising a first mount attached to and supporting said first pedal and movable along said first track and a second mount attached to and supporting said second pedal and movable along said second track;

a first rotatable crank member rotatably mounted on said frame;

a second rotatable crank member rotatably mounted on said frame;

a rotatable driver member connected to said first and second crank members and rotatably mounted on said frame;

transmission means operatively associated with said first and second pedals and said first and second rotatable crank members to transfer power alternatively from said first and second pedals through said first and second crank members to said rotatable driver member for imparting torque to said rotatable driver member responsive to alternate depression of said pedals along said pedal guide means from said retracted positions thereof to said extended positions thereof, said crank members having curved outer surfaces, and said transmission means including a first flexible member forming a first loop extending about said first crank member in engagement with the curved outer surface thereof and a second flexible member forming a second loop extending about said second crank member in engagement with the curved outer surface thereof, said first mount being attached to said first flexible member and said second mount being attached to said second flexible member, movement of said mounts along said tracks causing rotation of said first and second flexible members and said first and second crank member;

pedal interconnecting means interconnecting said first and second pedals and operable to move one of said pedals to the retracted position thereof from the extended position thereof when the other of said pedals is depressed by a force applied thereto and moves to the extended position thereof from the retracted position thereof, said pedal interconnecting means comprising a third flexible member, said first and second mounts affixed to said third flexible member at spaced locations on said third flexible member, said third flexible member forming a third loop, said first and second loops disposed in parallel planes and said third loop disposed in a plane perpendicular to said parallel planes; and shock absorber means including biasing means operatively associated with said third flexible member and each of said pedal mounts to exert a bias on said pedal mounts and allow a degree of relative movement between said third flexible member and said pedal mounts.

2. The propulsion apparatus according to claim 1 additionally comprising first and second spaced rotatable idlers connected to said frame adjacent to said first and second tracks, said first flexible member passing underneath said first idler and upwardly therefrom alongside and substantially parallel to said first track and said second flexible member passing underneath said second idler and upwardly therefrom alongside and substantially parallel to said second track.

3. The propulsion apparatus according to claim 1 wherein said third flexible member includes a plurality of elongated connector links, one of said elongated connector links being slidably disposed in one of said pedal mounts and another of said elongated connector links being slidably disposed in the other of said pedal mounts, said biasing means comprising coil compression springs surrounding each of said slidably disposed elongated connector links and exerting opposed biasing forces on said pedal mounts.

4. The propulsion apparatus according to claim 1 wherein said cycle includes a cycle wheel and wherein said rotatable driver member comprises a drive sprocket of a cycle.

5. The propulsion apparatus according to claim 4 additionally including a fourth flexible member for interconnecting said drive sprocket to said cycle wheel and wherein said transmission means additionally includes clutch means operatively associated with said first and second rotatable crank members, said drive sprocket and said fourth flexible member, said first rotatable crank member and said second rotatable crank member being alternately reciprocally rotated by said first and second pedals through said first and second flexible members and responsive to movement of said first and second pedals between said retracted and extended positions to operate said clutch means and cause said drive sprocket to rotate in a predetermined direction of rotation to turn said fourth flexible member and cycle wheel connected thereto.

6. The propulsion apparatus according to claim 1 wherein each said flexible member comprises a plurality of interconnected links forming a loop.

7. The propulsion apparatus according to claim 1 wherein said first and second mounts include rollers positioned respectively in said first and second tracks.

8. The propulsion apparatus according to claim 1 wherein said each of said first and second flexible members forms an endless loop.

9. The propulsion apparatus according to claim 1 wherein said third flexible member forms an endless loop.

10. The propulsion apparatus according to claim 8 wherein said first and second flexible members comprise endless belts.

11. The propulsion apparatus according to claim 9 wherein said third flexible member comprises an endless chain.

12. The propulsion apparatus according to claim 11 wherein said third flexible member is supported by toothed rollers.

13. Manually powered propulsion apparatus for propelling a cycle having a cycle frame, said propulsion apparatus comprising, in combination:

a first pedal;

a second pedal;

pedal guide means comprising spaced first and second tracks mounted on said frame;

mounting means mounting said first and second pedals on said pedal guide means for reciprocating movement of said first and second pedals between retracted and extended pedal positions, said mounting means comprising a first mount attached to and supporting said first pedal and movable along said first track and a second mount attached to and supporting said second pedal and movable along said second track;

a first rotatable crank member rotatably mounted on said frame;

a second rotatable crank member rotatably mounted on said frame;

a rotatable driver member connected to said first and second crank members and rotatably mounted on said frame;

transmission means operatively associated with said first and second pedals and said first and second rotatable crank members to transfer power alternatively from said first and second pedals through said first and second crank members to said rotatable driver member for imparting torque to said rotatable driver member responsive to alternate depression of said pedals along said pedal guide means from said retracted positions thereof to said extended positions thereof, said crank members having curved outer surfaces, and said transmission means including a first flexible member forming a first loop extending about said first crank member in engagement with the curved outer surface thereof and a second flexible member forming a second loop extending about said second crank member in engagement with the curved outer surface thereof, said first mount being attached to said second flexible member, movement of said mounts along said tracks causing rotation of said first and second flexible members and said first and second crank members;

pedal interconnecting means interconnecting said first and second pedals and operable to move one of said pedals to the retracted position thereof from the extended position thereof when the other of said pedals is depressed by a force applied thereto and moves to the extended position thereof from the retracted position thereof, said pedal interconnecting means comprising a third flexible member, said first and second mounts affixed to said third flexible member at spaced locations on said third flexible member, said cycle including a cycle wheel and said rotatable driver member comprising a drive sprocket of a cycle; and a fourth flexible member for interconnecting said drive sprocket to said cycle wheel and said transmission means additionally including clutch means operatively associated with said first and second rotatable crank members, said drive sprocket and said fourth flexible member, said first rotatable crank member and said second rotatable crank member being alternately reciprocally rotated by said first and second pedals through said first and second flexible members and responsive to movement of said first and second pedals between said retracted and extended positions to operate said clutch means and cause said drive sprocket to rotate in a predetermined direction of rotation to turn said fourth flexible member and cycle wheel connected thereto.

14. Manually powered propulsion apparatus for propelling a cycle having a cycle frame, said propulsion apparatus comprising, in combination:

a first pedal;

a second pedal;

pedal guide means comprising spaced first and second tracks mounted on said frame;

mounting means mounting said first and second pedals on said pedal guide means for reciprocating movement of said first and second pedals between retracted and extended pedal positions, said mounting means comprising a first mount attached to and supporting said first pedal and movable along said first track and a second mount attached to and supporting said second pedal and movable along said second track;

a first rotatable crank member rotatably mounted on said frame;

a second rotatable crank member rotatably mounted on said frame;

a rotatable driver member connected to said first and second crank members and rotatably mounted on said frame;

transmission means operatively associated with said first and second pedals and said first and second rotatable crank members to transfer power alternatively from said first and second pedals through said first and second crank members to said rotatable driver member for imparting torque to said rotatable driver member responsive to alternate depression of said pedals along said pedal guide means from said retracted positions thereof to said extended positions thereof, said crank members having curved outer surfaces, and said transmission means including a first flexible member forming a first loop extending about said first crank member in engagement with the curved outer surface thereof and a second flexible member forming a second loop extending about said second crank member in engagement with the curved outer surface thereof, said first mount being attached to said first flexible member and said second mount being attached to said second flexible member, movement of said mounts along said tracks causing rotation of said first and second flexible members and said first and second crank members; and pedal interconnecting means interconnecting said first and second pedals and operable to move one of said pedals to the retracted position thereof from the extended position thereof when the other of said pedals is depressed by a force applied thereto and moves to the extended position thereof from the retracted position thereof, said pedal interconnecting means comprising a third flexible member, said first and second mounts affixed to said third flexible member at spaced locations on said third flexible member, said third flexible member forming a third loop, said first and second loops disposed in parallel planes and said third loop being endless and disposed in a plane perpendicular to said parallel planes.

* * * * *